Figure 7:
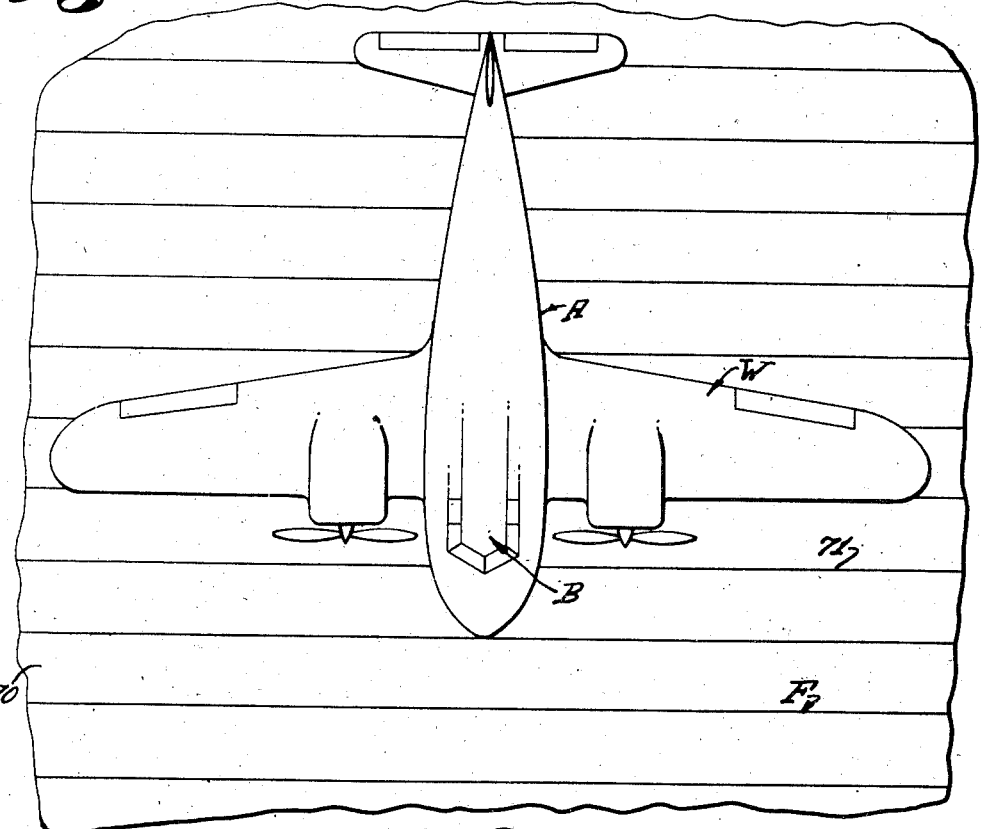

Jan. 7, 1947.  S. S. KNOX  2,413,924
AIRCRAFT INSTRUMENT
Filed Oct. 26, 1944  2 Sheets-Sheet 1
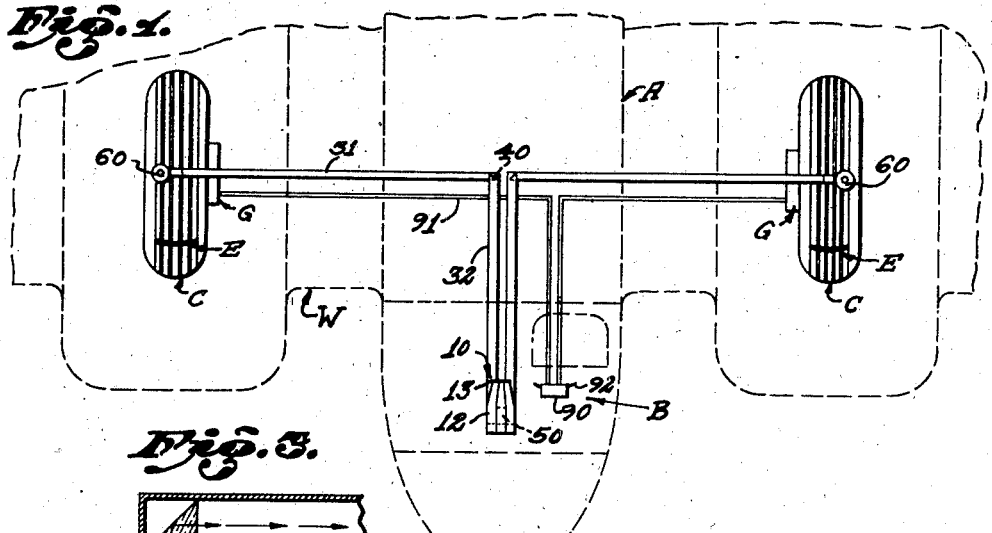
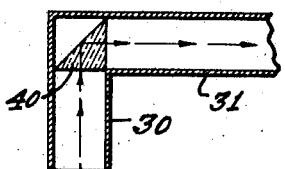
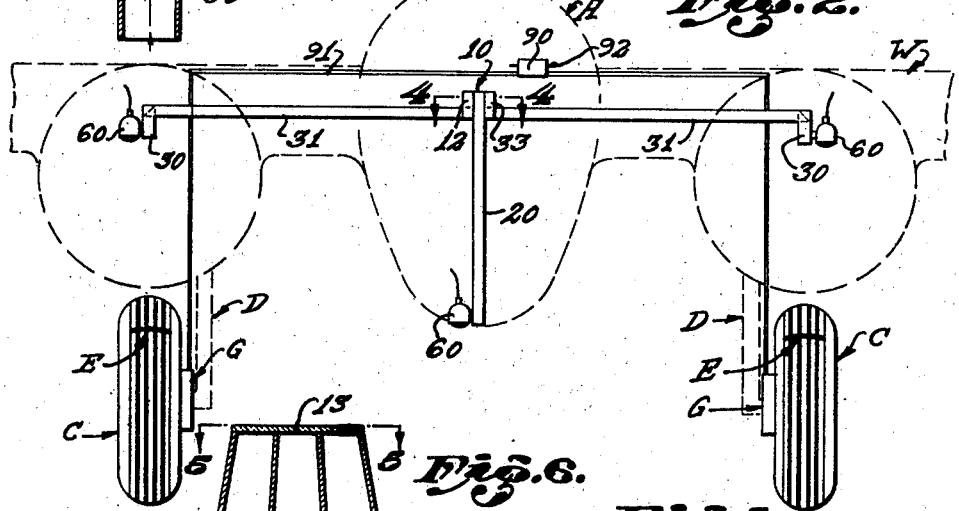
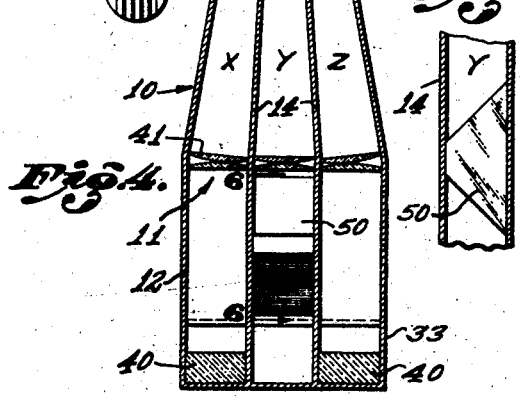
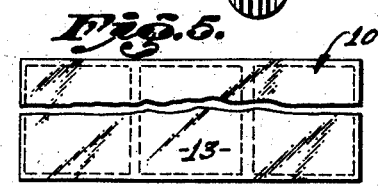
INVENTOR.
SAMUEL S. KNOX
BY
ATTORNEY Jan. 7, 1947.  S. S. KNOX  2,413,924
AIRCRAFT INSTRUMENT
Filed Oct. 26, 1944  2 Sheets-Sheet 2

INVENTOR.
SAMUEL S. KNOX
BY
ATTORNEY

Patented Jan. 7, 1947

2,413,924

UNITED STATES PATENT OFFICE 2,413,924

AIRCRAFT INSTRUMENT

Samuel S. Knox, Long Beach, Calif.

Application October 26, 1944, Serial No. 560,505

7 Claims. (Cl. 244—1)

This invention has to do with an aircraft instrument and is more specifically concerned with an instrument or unit of apparatus for indicating the operative relationship between the ground and the landing wheels of an aeroplane, and it is a general object of the present invention to provide a simple, practical, effective instrument of this general character.

In landing aeroplanes, and particularly when handling large aeroplanes, difficulties are frequently encountered when there is a substantial difference between the rotational speed of the treads of the landing wheels and the movement of the plane over the ground, commonly termed the ground speed.

To facilitate landing various means have been proposed and used to effect pre-rotation of the landing wheels of planes so that the rotational speeds of the peripheries of the wheels are substantially equal to the ground speed or to the speed of movement of the plane relative to the ground. Even with such pre-rotation of the landing wheels difficulties are experienced due to differences in speed between the several landing wheels, and due to the fact that it is practically impossible to gain exactly the same speed between the wheels and the ground. Reliance of a pilot upon pre-rotation is very likely to cause difficulty, whereas if the pilot is fully apprized of the lack of synchronism in the various factors involved he is prepared to handle the aeroplane accordingly.

It is a general object of my present invention to provide an instrument whereby a pilot can instantaneously ascertain the relationship of the factors hereinabove referred to so that he has the information necessary to make a safe and proper landing. With the knowledge gained from the instrument I have provided the shock of landing can be minimized, making landings safe and making it possible to lighten plane construction.

It is another object of my invention to provide apparatus such as I have referred to which is an optical instrument, or in which the factors are communicated to the pilot visually, making it unnecessary for him to read or compare instruments or indicators, such as speedometers or other like devices.

Another object of the invention is to provide an instrument of the general character hereinabove referred to which is wholly free of mechanically moving or operating parts complicated or expensive of manufacture or subject to failure. The instrument that I have provided involves elements that are extremely simple and inexpensive of manufacture and when once installed are not subject to improper operation.

Another object of my invention is to provide a visual or optical instrument of the general character hereinabove referred to, operable at night as well as during the day. My invention provides illuminating means making the instrument useful even though the parts to be viewed are not illuminated by daylight.

Another object of my invention is to provide coordination between the aeroplane and the ground or landing field, whereby the pilot can accurately estimate the ground speed and whereby the pilot is able to accurately compare the ground speed with that of the wheels of the aeroplane. With the information gained through the present apparatus the pilot can easily operate or regulate the pre-rotation units of the aeroplane wheels to gain almost perfect synchronism for landing.

Figure 8:
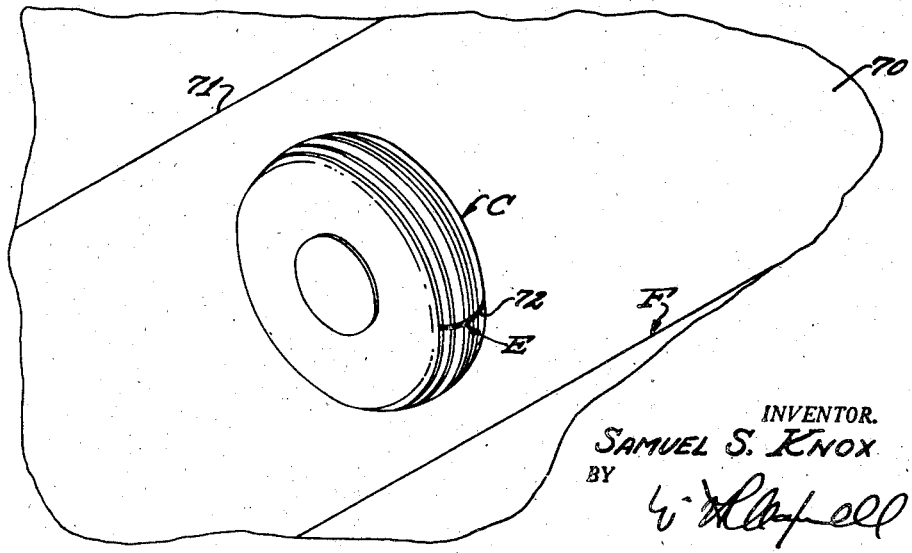

The various objects and features of my invention will be fully understood from the following detailed description of a typical preferred form and application of the invention, throughout which description reference is made to the accompanying drawings, in which:

Fig. 1 is a plan view of a typical unit of apparatus embodying the present invention, showing the manner in which such unit is related to a typical aeroplane. Fig. 2 is a front end view of the apparatus of the present invention likewise indicating its application to a typical aeroplane. Fig. 3 is an enlarged detailed sectional view of one portion of the apparatus that I have provided. Fig. 4 is a detailed sectional view taken substantially as indicated by line 4—4 on Fig. 2. Fig. 5 is an enlarged plan view taken as indicated by line 5—5 on Fig. 4. Fig. 6 is a sectional view taken as indicated by line 6—6 on Fig. 4. Fig. 7 is a view showing an aeroplane on a landing field marked for coordination with the apparatus on the aeroplane. Fig. 8 is a perspective view of one wheel of the aeroplane at the ground or landing field and showing the relationship of the markings provided on the wheel and field.

The instrument that I have provided is useful, generally, on aircraft to facilitate the landing thereof. The invention is particularly useful on aeroplanes or heavier than air craft which have to be landed at high speeds. In the drawings I have shown but one simple typical form of the invention and have indicated such form of the invention as applied to a typical aeroplane. The aeroplane indicated in the drawings includes a fuselage A with a pilot's compartment at B, landing wheels C located beneath wing W in opposite directions from or at either side of the fuselage, the wheels C being carried by a suitable supporting gear D so that they are retractable and so that they are spaced a substantial distance apart laterally of the plane when lowered to be in operating position, as shown in Fig. 2 of the drawings.

The present invention also coordinates the aeroplane with the landing field by relating reference marks E on the wheels C with reference marks F on the field. The reference marks with the aid of the instrument I have provided gives the pilot accurate information as to the speed of the wheels relative to the ground speed of the aeroplane so that any appreciable discrepancy can be corrected by suitable operation of the pre-rotation units G provided for the wheels.

The instrument that I have provided involves, generally, what I will term a viewing device 10 located so that it can be readily observed by the pilot in the pilot compartment B of the plane, and means 11 for projecting images of several different objects into the viewing device to be there visible in side by side relationship for immediate comparison.

In large aeroplanes that carry a pilot, a co-pilot and a flight engineer, the viewing device can be placed so that it will be operated by the flight engineer at times when not on automatic control.

In practice the essential elements of the invention will vary with the number and location of the objects to be viewed and with the structure of the aeroplane in which the instrument is incorporated. In an ordinary situation such as I have illustrated in the drawings the pilot or other person utilizing the information is supplied with the desired information when supplied with a view of each of the two wheels C and the ground over which the aeroplane is traveling. In this particular case the viewing device is such as to provide three images to be viewed by the pilot, and there are three separate parts to the means 11, one for projecting an image of the ground over which the plane is operating and one for projecting an image of each wheel C.

The particular viewing device shown in the drawings involves, generally, a case 12, tubular in form and provided at its upper end with a screen or ground glass 13. The tubular case is provided with partitions 14 which extend longitudinally therein and divide the case into three light ducts or passages X, Y and Z. The light ducts extend from the lower end of the case to the upper end where they are open to the ground glass 13.

Each of the several separate parts of the means 10 includes a light conveying tube having one end facing an object to be viewed and the other end facing one of the light ducts of the means 10. The light conveying tubes will, in practice, vary in shape and extent depending upon the relationship of the means 10 to the parts to be viewed. In the particular case illustrated, which is a typical case, the tube 20 of one part of means 11 designed to face the ground over which the plane is operated, may be a straight tube extending downwardly from one of the light ducts of means 10, preferably the center light duct Y of the means 10, as shown in Fig. 2 of the drawings. This light conveying tube 20 is joined to the case 12 of means 10 and is open at each end and is free of obstructions so that light reflected from the ground over which the plane is traveling enters the open lower end of the tube and passes upwardly through the tube to be passed therefrom into the duct Y in case 12.

In the arrangement illustrated the viewing device 10 is located between the wheels C and forward thereof and, therefore, each light conveying tube provided for receiving light from a wheel C has an outer end portion 30 which is vertically disposed over the wheel, a horizontal and inwardly extending lateral portion 31 which joins the upper end of the portion 30 and extends to a point near the center of the aeroplane, a forwardly extending axial portion 32 which projects forward from the inner end of the lateral portion 31, and a vertical inner end portion 33 which extends upwardly from the forward end of the axial portion 32. The outer portion 30 of each tube is preferably located to point to or to face the center of the wheel at which it is located. The upper ends of the tube portions 33 communicate with ducts of the case 12 of means 10, the said portion of one such light conveying tube communicating with duct X while the said portion of the other light conveying tube communicates with duct Z.

I provide reflectors 40 at the corners where the light conveying tube portions join so that light entering the upper ends of the tube portions 30 is reflected through the several portions of the tubes to enter the ducts X and Z.

The means 11 includes in addition to the tubes hereinabove described a condensing lens 41 in connection with each tube, preferably where it joins a duct of the means 10, the several lenses being such as to receive images from the tubes and throw or project them through the ducts of case 12 onto the ground glass 13.

It is to be understood that the tubes or various light conveying parts may, in practice, be of any desired shape or cross sectional configuration. In the preferred form of the invention the several tubes of the means 11 may be made fairly large in cross sectional extent to pass a substantial amount of light, and it may not be desirable to cast images on the ground glass as large as the cross sectional areas of the tubes. In such case the case 12 may be made tapered or convergent so that the end where the ground glass is located is substantially smaller than the end to which the several tubes of means 11 are joined, and the lenses 41 provided in the means 11 may be designed to cast images of the desired size on the ground glass 13.

In practice it is advantageous that the movements indicated on the ground glass 13, that is the images of the wheels and of the ground, should appear to be in the same direction so that the pilot can readily compare them. To accomplish this when the arrangement is such as I have shown in the drawings I provide a reversing prism 50 in the tube passing the image of the ground so that this image is reversed as otherwise it would be moving in a direction opposite to that of the wheels.

In accordance with the preferred form of my invention I provide a source of light, preferably a small spot-light, 60 at or near the outer end of each of the tubes 20 of means 11 and the lights are focused and directed so that when they are energized they shine brightly upon the spot from which light is desired to be reflected into the tubes. For instance the light on the center tube which faces the ground shines downwardly onto the ground immediately under that tube, whereas the other lights shine onto the wheels C immediately under or in line with the light conveying tubes facing the wheels.

In accordance with my invention I coordinate the aeroplane to the landing field so that the pilot or operators of the aeroplane can accurately determine the relationship between the speed of rotation of the wheels of the aeroplane and the land speed of the aeroplane. This phase of my invention will be best understood from a consideration of Figs. 7 and 8 of the drawings.

In accordance with my invention I provide a landing field 70 with a series of markings or what I will term reference marks 71 which extend transversely of the direction in which aeroplanes are to be landed. The reference marks may be formed on the surface of the field 70 in any suitable manner so long as they optically differentiate from the background or balance of the field. In practice they may be permanent markings or they may be markings such as are commonly used on playing fields to designate areas of such fields. The markings 70 may extend a substantial distance along the field and may be provided from one end of the field to the other. The markings are lines of suitable width and are uniformly disposed transversely of the direction or length of the field and, in accordance with my invention, they are uniformly spaced and have a spacing definitely related to the aeroplane.

In accordance with my invention I relate the spacing of the reference marks 71 on the landing field to reference marks 72 on the landing wheels of the aeroplane. In the preferred form of my invention I provide a single reference mark on the peripheral portion of each landing wheel, preferably a mark extending across the tread portion of the wheel, as shown in the drawings, and in the preferred relationship between the reference marks on the landing wheels and those on the landing field the marks on the field are spaced apart a distance equal to the circumference of the wheels.

When the reference marks are used on the wheels of the aeroplane and the landing field the viewing apparatus that I have described above will give a person in the aeroplane a view of the reference marks somewhat in the nature of flashes as the marks pass the viewing parts. For instance, as each wheel revolves there will be a flash on the ground glass viewing that wheel each time the wheel turns, and in like fashion as the aeroplane moves over the ground or landing field the reference marks thereon will give flashes as the viewing apparatus passes over them. A person in the aeroplane can readily observe the flashing effect gained by the reference marks on the two wheels and can bring the wheels into proper synchronism and the speed of both wheels can be brought into proper synchronism with the ground speed through the knowledge gained by the flashes appearing at the viewing device.

In the drawings I have indicated a pre-rotating unit G at each landing wheel and have shown a control 90 in the aeroplane adjacent the viewing unit 10. I have indicated the control 90 coupled with each unit G by a suitable control connection 91 and have shown individual control levers 92 at the control 90 so that the wheels can be individually controlled. It is to be understood that my present invention is in no way concerned with the means or mechanism used for effecting pre-rotation of the wheels, nor with the means employed for effecting control of the pre-rotating means. Any suitable apparatus can be used in this connection, insofar as my present invention is concerned.

It will be apparent from the foregoing description that the apparatus may be made wholly automatic, that is, through electronic means or other suitable means the flashing effect gained at the ground glasses of the viewing device can be utilized as the means or medium for effecting adjustment of the pre-rotation units. For instance, an electronic unit or units can be provided to operate under control of the flashes at the ground glasses to regulate the control levers 92 or equivalent control parts of the pre-rotation units so that the pre-rotating means are automatically adjusted so that the wheels of the aeroplane are operating in true synchronism with the ground speed when the aeroplane reaches the ground.

With the apparatus that I have provided light from the several objects, that is, from the two wheels C and from the surface of the landing field immediately under the plane, is reflected through the tubes of the means 11 and is directed between lenses 41 so that several images are thrown on the ground glass 13. These several images, characterized by the flashes or flash-like effect gained by the provision of the reference marks on the field and wheels, give the pilot a view of the objects to which the tubes of the means 11 are faced and as the pilot is landing he can glance at the ground glass where the images are projected and if there is a substantial lack of synchronism between the wheels or between the wheels and ground speed, he can operate the controls of the pre-rotating means to bring about the necessary correction. For instance, in the case illustrated in the drawings the pilot can instantaneously view images of the field immediately under the plane and the treads of the two wheels C. If there is any substantial discrepancy or variation between the relative speeds of these objects the pilot will be aware of that fact and in making a landing can either vary or manipulate the pre-rotation equipment, if that is possible, or can handle the plane to make the necessary compensations.

From the foregoing description it will be apparent that I have provided an optical instrument which is entirely free of working or moving parts subject to failure or which are heavy and complicated. The apparatus that I have provided, when once properly installed, remains static and is at all times available for use. Further, it is important that the instrument that I have provided is wholly optical and is such that a pilot can read it instantaneously and does not have to compare numerous dials or instrument readings in order to ascertain the information desired.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. A landing field for aeroplanes, the field having a series of normally visible uniform and equally spaced reference marks thereon extending transverse of the direction in which aeroplanes land thereon.

2. A landing field for aeroplanes, the field having a series of reference marks thereon extending transverse of the direction in which aeroplanes land thereon, the marks being uniformly spaced apart and all extending in the same direction and being such as to contrast optically with the balance of the field.

3. A landing field for aeroplanes, the field having a series of normally visible reference marks thereon all extending in the same direction and extending transverse of the direction in which aeroplanes land thereon, the marks being spaced apart distances substantially equal to the circumference of the landing wheels of aeroplanes to land on the field.

4. In combination a landing field having a series of spaced transversely disposed visible reference marks thereon, and an aeroplane with an optical viewing device whereby a person in the aeroplane can view a part of the field and observe the reference marks as the aeroplane approaches a landing on the field.

5. In combination a landing field having a series of spaced transversely disposed visible reference marks thereon, and an aeroplane with landing wheels having reference marks thereon, controllable means for pre-rotating the wheels, and a viewing device for viewing the field and the wheels.

6. In combination a landing field having a series of spaced transversely disposed visible reference marks thereon, and an aeroplane with landing wheels having reference marks thereon, controllable means for pre-rotating the wheels, and a viewing device for simultaneously viewing the field beneath the aeroplane and the portions of the wheels bearing the reference marks.

7. In combination a landing field having a series of spaced transversely disposed visible reference marks thereon, and an aeroplane with landing wheels having reference marks thereon at the peripheral portions thereof, controllable means for pre-rotating the wheels, and a viewing device for viewing the field and the wheels.

SAMUEL S. KNOX.